United States Patent
Huang et al.

(10) Patent No.: US 11,004,107 B2
(45) Date of Patent: May 11, 2021

(54) TARGET USER DIRECTING METHOD AND APPARATUS AND COMPUTER STORAGE MEDIUM

(71) Applicant: TENCENT TECHNOLOGY (SHENZHEN) COMPANY LIMITED, Guangdong (CN)

(72) Inventors: Hao Huang, Guangdong (CN); Dong Bo Huang, Guangdong (CN); Ge Chen, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 300 days.

(21) Appl. No.: 16/005,936

(22) Filed: Jun. 12, 2018

(65) Prior Publication Data

US 2018/0293609 A1    Oct. 11, 2018

Related U.S. Application Data

(63) Continuation of application No. PCT/CN2017/081910, filed on Apr. 25, 2017.

(30) Foreign Application Priority Data

May 5, 2016    (CN) .......................... 201610294665.7

(51) Int. Cl.
*G06Q 30/02* (2012.01)

(52) U.S. Cl.
CPC ..... *G06Q 30/0243* (2013.01); *G06Q 30/0267* (2013.01); *G06Q 30/0269* (2013.01); *G06Q 30/0277* (2013.01)

(58) Field of Classification Search
None
See application file for complete search history.

(56) References Cited

U.S. PATENT DOCUMENTS

| 9,330,209 B1 * | 5/2016 | Kamprath .......... G06Q 30/0254 |
| 2011/0225046 A1 * | 9/2011 | Eldering ............ G06Q 30/0255 |
| | | 705/14.53 |

(Continued)

FOREIGN PATENT DOCUMENTS

| CN | 103546768 A | 1/2014 |
| CN | 103631803 A | 3/2014 |

(Continued)

OTHER PUBLICATIONS

Sharad Goel, and Daniel G. Goldstein. "Predicting Individual Behavior with Social Networks." Marketing science (Providence, R.I.) 33.1 (2014): 82-93. Web. (Year: 2014).*

(Continued)

*Primary Examiner* — Michael Bekerman
*Assistant Examiner* — Scott Snider
(74) *Attorney, Agent, or Firm* — Sughrue Mion, PLLC

(57) ABSTRACT

A target user directing method and apparatus and provided. The method includes determining a similarity between each of candidate users and a seed user by using a similarity model. A conversion prediction model is used to predict a probability that each of the candidate users performs a conversion operation on to-be-delivered information. One or more target users for the to-be-delivered information are selected from the candidate users according to the similarity that is determined and the probability that is predicted for each of the candidate users. The to-be-delivered information is transmitted to the one or more target users.

8 Claims, 13 Drawing Sheets

(56) References Cited

U.S. PATENT DOCUMENTS

| | | | | |
|---|---|---|---|---|
| 2011/0246285 | A1* | 10/2011 | Ratnaparkhi | G06Q 30/0243 |
| | | | | 705/14.42 |
| 2012/0005021 | A1* | 1/2012 | Ratnam | G06Q 30/0201 |
| | | | | 705/14.54 |
| 2012/0278161 | A1 | 11/2012 | Lazzaro | |
| 2014/0122472 | A1* | 5/2014 | Wells | G06Q 30/0204 |
| | | | | 707/732 |
| 2014/0280237 | A1* | 9/2014 | Salkola | G06Q 50/01 |
| | | | | 707/749 |
| 2015/0006294 | A1* | 1/2015 | Irmak | G06Q 50/01 |
| | | | | 705/14.66 |
| 2017/0140283 | A1* | 5/2017 | Cheng | G06N 20/00 |
| 2017/0178197 | A1* | 6/2017 | Hong | G06Q 30/0277 |
| 2017/0330239 | A1* | 11/2017 | Luo | G06Q 30/0269 |

FOREIGN PATENT DOCUMENTS

| | | | |
|---|---|---|---|
| CN | 103729780 | A | 4/2014 |
| CN | 104063801 | A | 9/2014 |
| CN | 104809144 | A | 7/2015 |
| CN | 105279204 | A | 1/2016 |
| CN | 105447730 | A | 3/2016 |
| CN | 105550903 | A | 5/2016 |

OTHER PUBLICATIONS

Michael Trusov, Anand V. Bodapati, and Randolph E. Bucklin. "Determining Influential Users in Internet Social Networks." Journal of marketing research 47.4 (2010): 643-658. Web. (Year: 2010).*
Written Opinion of the International Searching Authority dated Jul. 28, 2017, in International Application No. PCT/CN2017/081910.
Communication dated Mar. 18, 2020, from the State Intellectual Property Office of the P.R.C. in application No. 201610294665.7.
International Search Report for PCT/CN2017/081910 dated Jul. 28, 2017 [PCT/ISA/210].
Communication dated Aug. 14, 2020, from the State Intellectual Property Office of the P.R.C. in application No. 201610294665.7.

* cited by examiner

TARGET USER DIRECTING METHOD AND APPARATUS AND COMPUTER STORAGE MEDIUM

CROSS-REFERENCE TO RELATED APPLICATIONS

This Application is a continuation of International Patent Application No. PCT/CN2017/081910 on Apr. 25, 2017, which claims priority from Chinese Patent Application No. 2016102946657 filed on May 5, 2016, the disclosures of each of which are incorporated by reference herein in their entirety.

BACKGROUND

1. Field

The present disclosure relates to the field of information technologies, and in particular, to a target user directing method and apparatus, and a computer storage medium.

2. Description of the Related Art

When to-be-delivered information is delivered, to implement accurate delivering, user directing may be performed. A user that watches the delivered information or performs an operation on the delivered information is discovered. In this way, accurate delivering may be implemented. Moreover, message delivery to a user not interested in the delivered information may be reduced.

SUMMARY

It is an aspect to provide a target user directing method that may improve the accuracy of a target user of to-be-delivered information.

According to an aspect of one or more exemplary embodiments, there is provided a method. The method includes determining a similarity between each of candidate users and a seed user by using a similarity model. A conversion prediction model is used to predict a probability that each of the candidate users performs a conversion operation on to-be-delivered information. One or more target users for the to-be-delivered information are selected from the candidate users according to the similarity that is determined and the probability that is predicted for each of the candidate users. The to-be-delivered information is transmitted to the one or more target users.

According to other aspects of one or more exemplary embodiments, there is also provided an apparatus and a computer readable storage medium consistent with the method.

DETAILED DESCRIPTION

Figure 1A:
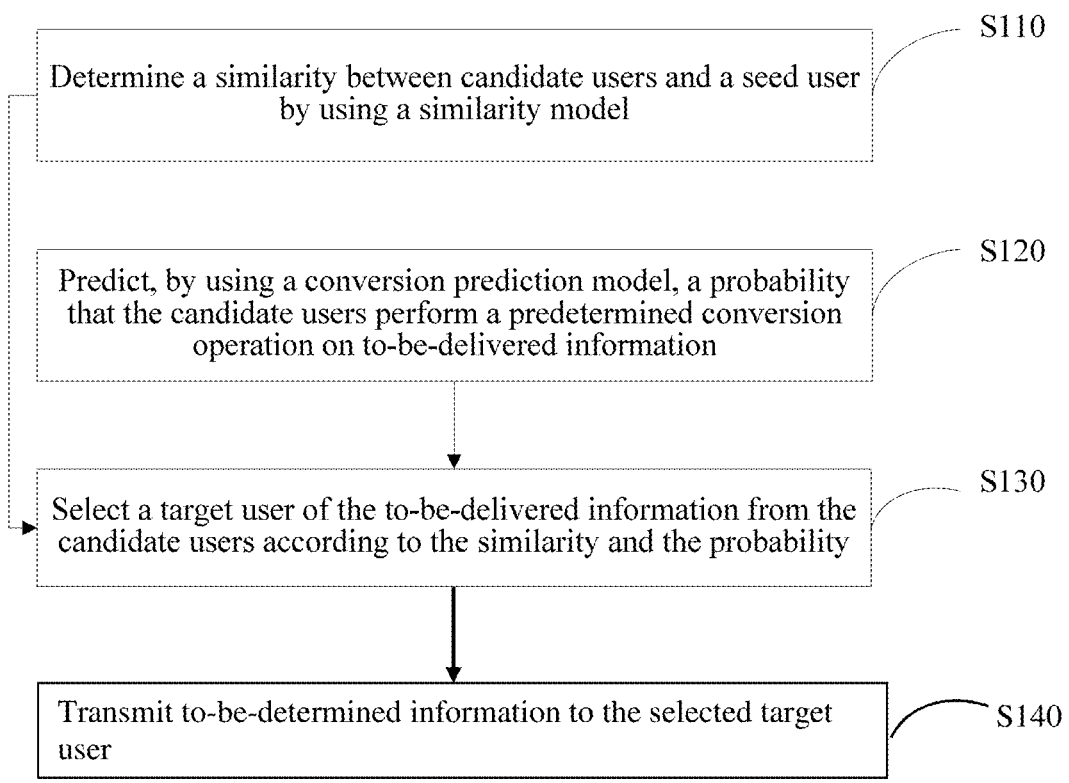
FIGS. 1A-1G are schematic flowcharts of a target user directing method according to various exemplary embodiments.

The following further describes the technical solutions of the present disclosure with reference to the accompanying drawings and specific embodiments. It should be understood that, the exemplary embodiments described below are merely for illustration and explanation of the present disclosure, but not for limiting the present disclosure.

In the related art technology, when user directing is performed, a manner usually used is obtaining a classification model according to an attributive feature of a seed user. When user directing is performed, a similarity between candidate users and a seed user is calculated by using the classification model, a user of a high similarity to the seed user is selected as a delivery object of the to-be-delivered information, thereby implementing user directing. However, it is found in practice that a delivery object determined by using such a target user directing method according to the related art technology still cannot effectively implement user conversion, and the accuracy of directing still does not achieve an expected effect.

When determining a target user for to-be-delivered information, the target user directing method and apparatus and the computer storage medium provided according to one or more exemplary embodiments predict, with reference to a similarity between candidate users and a seed user and by using a conversion prediction model, a probability that the candidate users perform a conversion operation on the to-be-delivered information, and select a target user, as a delivery object of the to-be-delivered information from multiple candidate users in at least the two dimensions. Compared with the related art target user directing technology in which only a user similar to the seed user is selected as a target user, because the probability estimated by using the conversion prediction model is used, the accuracy of selecting a target user is improved. In addition, a probability that the conversion operation is performed on to to-be-delivered information after being delivered is improved, and a delivery effect is improved.

As shown in FIG. 1, this exemplary embodiment provides a target user directing method, including:

Step S110: Determine a similarity between candidate users and a seed user by using a similarity model;

Step S120: Predict, by using a conversion prediction model, a probability that the candidate users perform a predetermined conversion operation on to-be-delivered information;

Step S130: Select a target user of the to-be-delivered information from the candidate users according to the similarity and the probability; and Step S140: Transmit the to-be-delivered information to the target user.

In this exemplary embodiment, Step S110: Determine a similarity between candidate users and a seed user by using a similarity model. The similarity herein may be expressed by using a value of 0 to 1, or be expressed in percentage. In this exemplary embodiment, the seed user may be a user that is provided by the to-be-delivered information and that is interested in an information subject matter of the to-be-delivered information, or a user that has used the subject matter. For example, the to-be-delivered information is an advertisement of a mobile phone of a brand, and the seed user may be a user that has bought a mobile phone of the brand. The mobile phone of the brand is an information subject matter of the advertisement, and an information subject matter of an advertisement may also be referred to as an advertisement subject matter. For example, the to-be-delivered information is delivered for a first time, the information subject matter in the to-be-delivered information has not appeared on the market. In this case, the seed user may be a seed user of delivered information that satisfies a preset similarity to the to-be-delivered information. Using a mobile phone as an example, the information subject matter of the to-be-delivered information is a mobile phone A, a feature of the mobile phone A is quite similar to that of a mobile phone B that is an information subject matter of delivered information. In this case, apparently, most of seed users of the delivered information possibly are seed users of the to-be-delivered information. Certainly, there are various definitions and providing manners of a seed user, which are not limited to the foregoing manner.

In step S120, a probability that the candidate users perform a conversion operation is predicted by using a conversion prediction model. In this exemplary embodiment, the conversion prediction model may be a model that may be configured to predict that a user performs a corresponding conversion operation.

The conversion operation may include an operation corresponding to a conversion behavior, such as a click operation, an attention operation, or a purchase operation. For example, the to-be-delivered information is an advertisement. After the advertisement is pushed to a social application interface of a user, the user may see the advertisement. Some users are possibly interested in the advertisement, and possibly enter a detailed page of the advertisement by clicking on the advertisement. The detailed page of the advertisement may include detailed reception of an advertisement subject matter of the advertisement. For example, the advertisement is an automobile advertisement. If detecting an operation of clicking on the automobile advertisement, a client displays a detailed page of the automobile advertisement. The detailed page may include performance parameters of the automobile, purchase parameters such as a price and a purchase channel, and so on. In this exemplary embodiment, the click operation of clicking on the automobile advertisement is one of the conversion operation according to this exemplary embodiment. In step S120, a probability that the candidate users perform the conversion operation on the to-be-delivered information is predicted by using a conversion prediction model.

In step S130, a target user of the to-be-delivered information is selected from the candidate users with reference to information of at least the two dimensions, namely, the similarity and the probability, to complete directing of a delivery object of the to-be-delivered information.

In this exemplary embodiment, the to-be-delivered information may be various to-be-exposed or to-be-published information that may include information such as an advertisement, an announcement and a notification. For example, some announcements are not directed to all people, but rather are directed only to some people. When the announcements are published, the announcements may be focused on information related to only some people. For example, when the announcement "canceling credits of pupils" is published to all people, to focus on notifying parents of the pupils, the announcement may be focused by being sent to communications accounts of the parents of the pupils, to prevent that some parents experience a phenomenon where schools charge arbitrarily without being aware. Apparently, the announcement may alternatively select a crowd having children by combining using step S110 to find out a crowd of similar age to the parents of the pupils and predicting a click rate.

In short, the target user directing method provided in this exemplary embodiment selects a target user of the to-be-delivered information by combining the two dimensions, that is, calculating a similarity of a user feature of a seed user and predicting a probability of a conversion prediction model, which has a feature of the high directing accuracy, and may significantly improve a probability of delivered information.

The user feature according to this exemplary embodiment may include a population attributive feature, a device attributive feature and an interest attributive feature. The population attributive feature may usually include a user attributive feature such as gender, age, location or occupation. The device attributive feature may include an attribute such as a device type used by a user, a device brand and a communications operator. The interest attributive feature may include a feature that may represent a user interest or preference, such as a user interest label, a user behavior preference, a webpage and/or an application browsing behavior feature or a game preference feature.

Figure 1B:
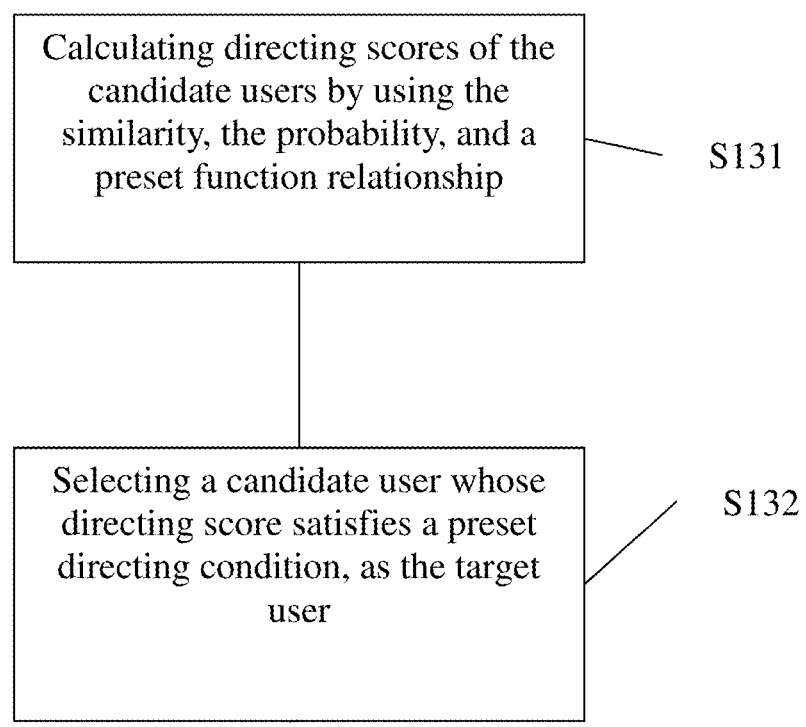

In an exemplary embodiment, at shown in FIG. 1B, step S130 may include:

Step S131: calculating directing scores of the candidate users by using the similarity, the probability, and a preset function relationship; and Step S132: selecting a candidate user whose directing score satisfies a preset directing condition, as the target user.

The similarity in this exemplary embodiment may be a value of 0 to 1. The probability is also a value of 0 to 1. The similarity and the probability are calculated as dependent variables of the preset function relationship. Obtained function values are the directing scores.

For example, weight calculation is directly performed on the similarity and the probability, the directing scores are obtained. Finally, according to the directing scores, a candidate user whose directing score is greater than a preset value may be selected as the target user. Alternatively, first M candidate users whose directing scores are greatest as the target user.

Apparently, the target user is selected in such a manner that the target user and a seed user are similar enough, therefore, a probability of reading the to-be-delivered information in detail or performing a corresponding conversion operation is great, and the probability of performing the corresponding conversion operation obtained by predicting a conversion prediction model ensures again that the selected target user has a relatively high probability of performing the conversion operation on the to-be-delivered information, which apparently implements accurate directing of a target user, and may improve a probability that to-be-delivered information is delivered to a user.

Figure 1C:
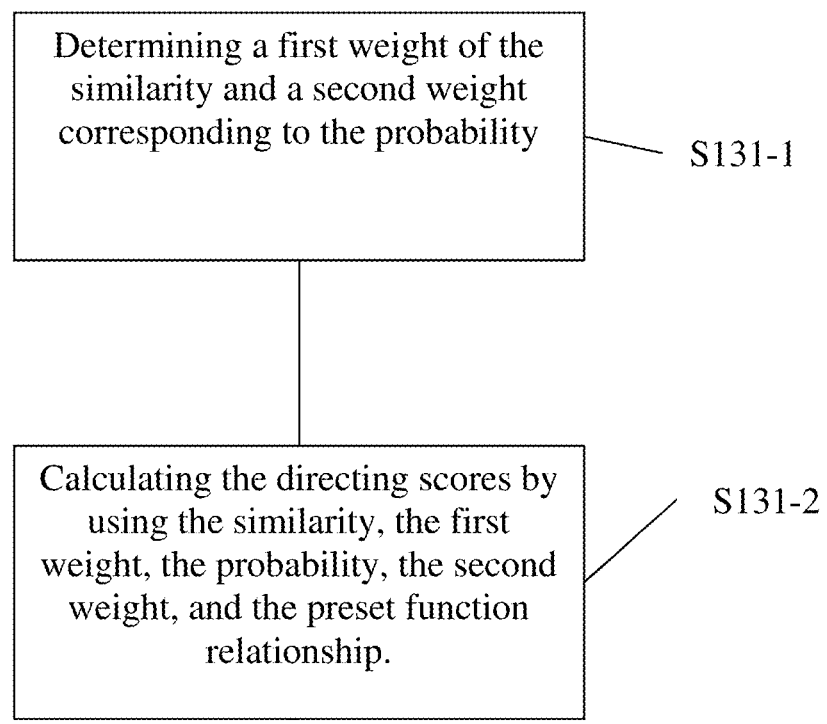

In another embodiment, step S130 may include:

Step S131: calculating directing scores of the candidate users by using the similarity, the probability, and a preset function relationship; and Step S132: selecting a candidate user whose directing score satisfies a preset directing condition, as the target user.

the calculating directing scores of the candidate users by using the similarity, the probability, and a preset function relationship of Step S131 may include as shown in FIG. 1C:

Step S131-1: determining a first weight of the similarity and a second weight corresponding to the probability; and Step S131-2: calculating the directing scores by using the similarity, the first weight, the probability, the second weight, and the preset function relationship.

In this exemplary embodiment, when the directing scores are determined, weights corresponding to the similarity and the probability are respectively determined. In an exemplary embodiment, the weight corresponding to the similarity is a first weight, the weight corresponding to the probability is a second weight.

The first weight and the second weight may be determined according to attributive information obtained by the to-be-delivered information. For example, the first weight and the second weight are determined according to a target attribute of the to-be-delivered information. For example, the to-be-delivered information is an advertisement that improves brand awareness, and the target attribute has no relatively high request for a transmission rate, a review rate or a click rate. If the conversion prediction model is used in this case, a weight of a click probability may be relatively little when the directing scores are calculated. If the conversion prediction model is a transmission prediction model or a review prediction model to obtain a transmission probability and a review probability, second weights corresponding to the transmission probability and the review probability may be set to be relatively great.

It should be noted that the conversion prediction model in the exemplary embodiment may include a plurality of independent models that predict probabilities of different conversion operations. The number of the conversion prediction models may be one. The conversion prediction model may a combined model that may predict one or more probabilities of the conversion operations at the same time.

The directing scores may be calculated by compositing the one or more probabilities obtained by using the foregoing conversion prediction model.

The first weight and the second weight may be determined according to an information attribute of the to-be-delivered information. The information attribute may include attributive information such as a type of the to-be-delivered information, or a delivery target of the to-be-delivered information. In a specific implementation process, the first weight and the second weight may alternatively be directly determined based on a user indication provided by an information provider or publisher of the to-be-delivered information. In short, there are various methods for determining the first weight and the second weight, which are not limited to any of the foregoing methods.

For example, in step S130, the directing scores may be calculated according to the following function relationship:

$$P = p1*a + p2*b$$

The P denotes a directing score; the p1 denotes the similarity between the candidate users and the seed user; the a denotes the first weight; the p2 denotes the probability; and the b denotes the second weight.

The foregoing is only an example that the preset function relationship solves the directing scores, and is not limited to the foregoing function relationship during specific implementation.

In step S130, the P may be ranked. A target user for delivering the to-be-delivered information is determined by selecting several candidate users that rank in front.

In this exemplary embodiment and based on the foregoing exemplary embodiment, the first weight and the second weight are introduced, and the function relationship may be flexibly adjusted. In this way, a bias of the selected target user in the similarity and the probability of performing the conversion operation, to satisfy delivery features of different to-be-delivered information.

Figure 1D:
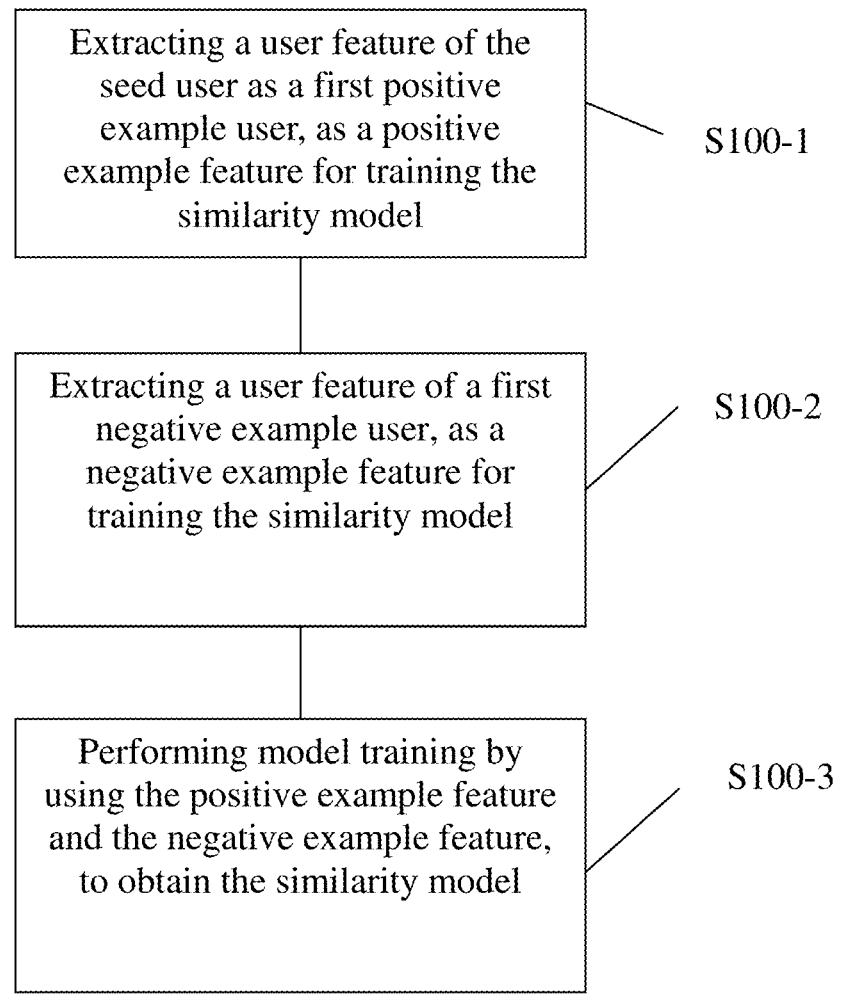

In addition, in some exemplary embodiments, before the determining the similarity of Step S110, the method may further include as shown in FIG. 1D:

Step 100-1: extracting a user feature of the seed user as a first positive example user, as a positive example feature for training the similarity model;

Step 100-2: extracting a user feature of a first negative example user, as a negative example feature for training the similarity model; and Step 100-3: performing model training by using the positive example feature and the negative example feature, to obtain the similarity model.

In this exemplary embodiment, the seed user is as the first positive example user for training the similarity model; extracts the user feature of the seed user; and extracts the user feature of the first negative example user, as the negative example feature. The first negative example user may be any other user besides the seed user, and certainly may alternatively be a selected user that is greatly different from the seed user.

Various to-be-trained models such as a neural network and a learning machine are trained by using the positive example feature and the negative example feature, to obtain similarity model. The similarity model may be configured to select a candidate user of a relatively high similarity to the seed user. In this exemplary embodiment, the similarity model may be configured to output the similarity between the candidate users and the seed user.

In this exemplary embodiment, the seed user may be a user provided by an information provider of the to-be-delivered information, and may alternatively be a seed user of information that satisfies a preset similarity to the to-be-delivered information that is stored in a database and has been watched. The similarity model trained in this way may be configured to select candidate users quite similar to a seed user, as target users of to-be-delivered information. A similarity between the users and the seed user means a relatively high probability of reading to-be-delivered information or performing a corresponding conversion operation.

Figure 1E:
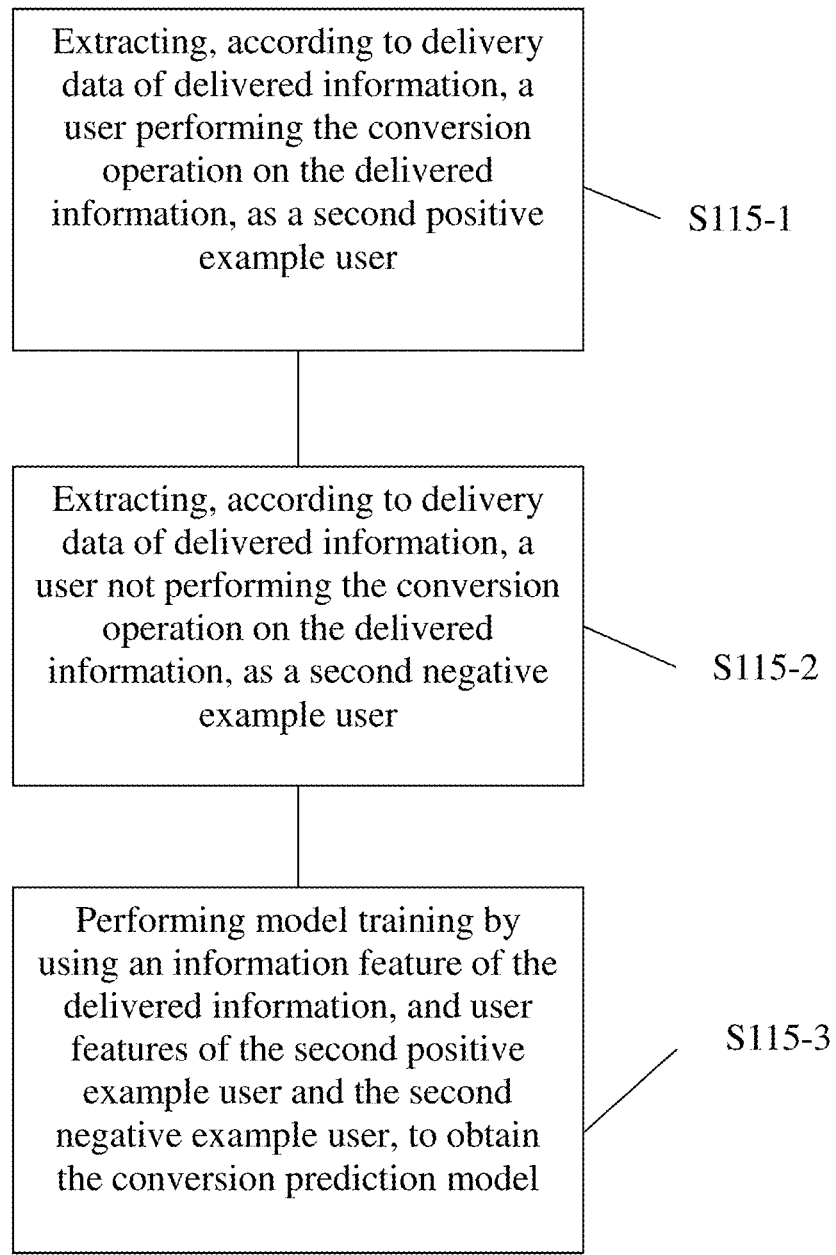

In addition, in some exemplary embodiments, before the predicting the probability of Step S120, the method may further include as shown in FIG. 1E:

Step S115-1: extracting, according to delivery data of delivered information, a user performing the conversion operation on the delivered information, as a second positive example user;

Step S115-2: extracting, according to delivery data of delivered information, a user not performing the conversion operation on the delivered information, as a second negative example user; and Step S115-3: performing model training by using an information feature of the delivered information, and user features of the second positive example user and the second negative example user, to obtain the conversion prediction model.

In this exemplary embodiment, the user performing the conversion operation on the delivered information is used as the second positive example user, and the user not performing the conversion operation on the delivered information is used as the second negative example user. When the conversion prediction model is performed, a user feature of the second positive example user is extracted as a positive example feature; a user feature of the second negative example user is extracted as a negative example feature; and determining a probability of performing the corresponding conversion operation of each candidate user on to-be-delivered information may be trained with reference to an information feature of the delivered information.

Specifically, for example, the extracting, according to delivery data of delivered information, a user performing the conversion operation on the delivered information, as a second positive example user includes: extracting, according to the delivery data of the delivered information, a user that receives a display of the delivered information and performs a predetermined operation on the delivered information, as the second positive example user; the extracting, according to delivery data of delivered information, a user not performing the conversion operation on the delivered information, as a second negative example user includes: extracting a user that receives the display of the delivered information and does not perform the predetermined operation on the delivered information, as the second negative example user.

For example, the to-be-delivered information is pushed in a social account such as WeChat. For example, abstract information or brief information of the information B is displayed in WeChat Moments of a user B and a user C. If the user clicks on the abstract information or the brief information of the information B, and enters a detailed information page of the information B, the user B may be as the second positive example user. If the user C does not click on the abstract information or the brief information of the information B, or enter the detailed information page of the information B, the user C is as the second negative example user. In short, this exemplary embodiment provides a method for training the conversion prediction model, which has features of simple implementation and the high prediction accuracy.

Figure 1F:
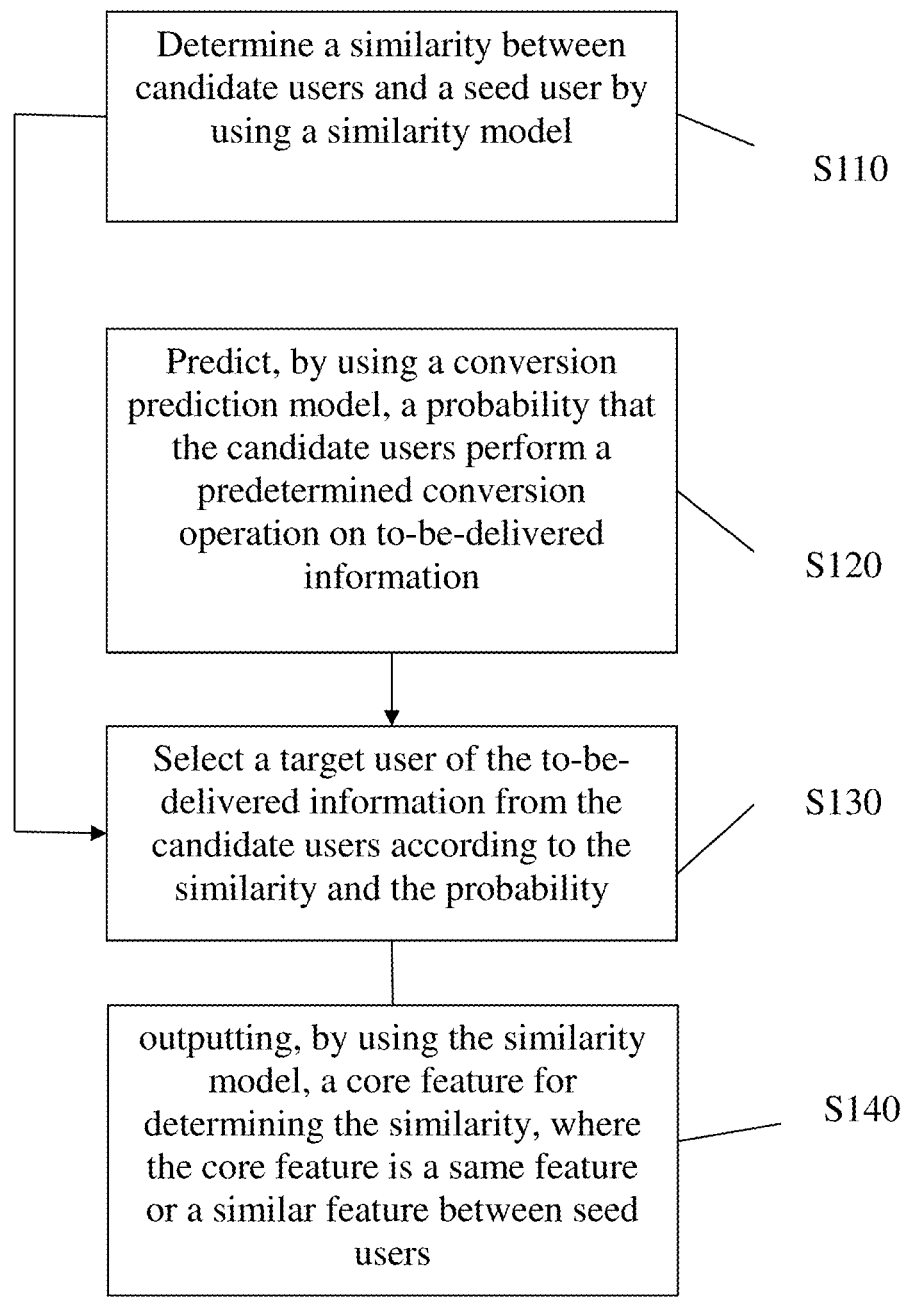

In some exemplary embodiments, in addition to Steps S110, S120, and S130, the method may further include as shown in FIG. 1F:

Step S140: outputting, by using the similarity model, a core feature for determining the similarity, where the core feature is a same feature or a similar feature between seed users.

In this exemplary embodiment, the similarity model outputs a core feature for determining the similarity. The core feature is usually probably a same feature or a similar feature between seed users. For example, ages of the seed users are in a range of 23 to 27, and the feature that ages are 23 to 27 is the core feature.

For example, some user features of the seed users are usually of a high similarity. For example, areas are located in Shanghai, an area around Shanghai, or the like. The user features are probably main features for distinguishing whether a candidate user is a target user of the to-be-delivered information. In this exemplary embodiment, the strong distinction degree feature may be determined by calculating an information gain rate of each user feature, to facilitate a check of the information provider or publisher of the to-be-delivered information.

The following is a calculation formula of the gain information rate IGR.

$$IGR = \frac{H(C) - \frac{xi}{\sum xi} H(C \mid Xi)}{\sum H(Xi)}$$

The H(C|Xi) represents information entropy where a value of a user feature C of a Xth user is Xi; the H(Xi) represents information entropy where user features of all users are Xi; and the H(C) represents information entropy of user features C of all the users. The strong distinction degree feature may be selected according to the IGR. Specifically, for example, a user feature whose IGR is greater than a specified threshold value is selected as the strong distinction degree feature to be output, or a user feature whose IGR ranks in first N is selected as the strong distinction degree feature to be output.

Using the method according to this exemplary embodiment may facilitate a user and a staff. The user and the staff are determined to know that currently calculating a similarity is to distinguish high distinction degree features of candidate users that satisfy a predetermined similarity to a seed user or not.

Figure 1G:
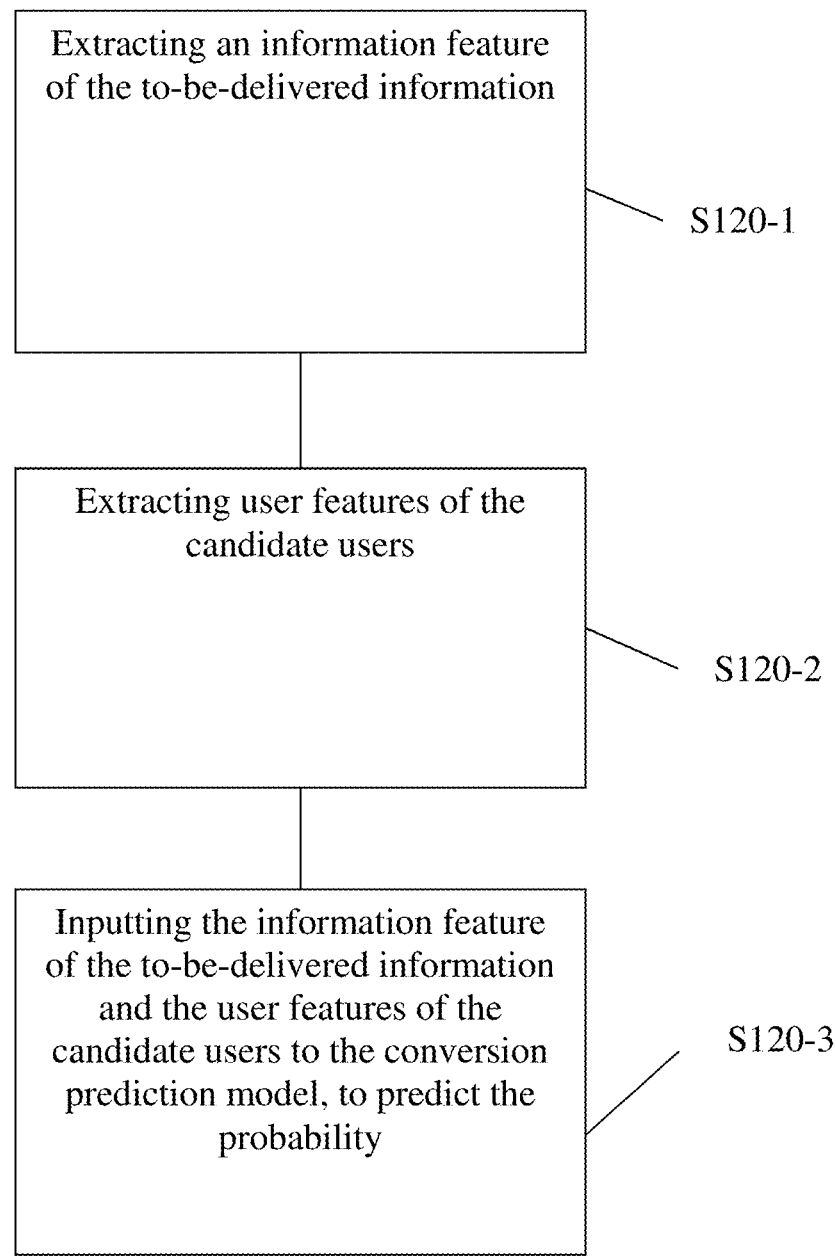

Optionally, as shown in FIG. 1, this exemplary embodiment provides a target user directing method, including:

Step S110: Determine a similarity between candidate users and a seed user by using a similarity model;

Step S120: Predict, by using a conversion prediction model, a probability that the candidate users perform a predetermined conversion operation on to-be-delivered information. As shown in FIG. 1G, Step S120 may include: S120-1: extracting an information feature of the to-be-delivered information; S120-2: extracting user features of the candidate users; and S120-3: inputting the information feature of the to-be-delivered information and the user features of the candidate users to the conversion prediction model, to predict the probability.

Step S130: Select a target user of the to-be-delivered information from the candidate users according to the similarity and the probability.

This exemplary embodiment is further improved based on any one of the foregoing embodiments, and may be used with reference to any technical solution provided in the foregoing embodiments without inconsistency to form a new technical solution. For example, in this exemplary embodiment, for determining of the guiding scores, reference may be made to Embodiment 2 or Embodiment 3; for determining the similarity model and the conversion prediction model, reference may be made to Embodiment 4, Embodiment 5 and so on; and for outputting the core feature, reference may be made to Embodiment 6.

In step S120 of this exemplary embodiment, inputting the information feature of the to-be-delivered information and the user features of the candidate users to the conversion prediction model may estimate the probability that each candidate user performs the corresponding conversion operation on the to-be-delivered information. For example, the information A is the to-be-delivered information, and a user A and a user B are both the candidate users. When the probability is predicted, information feature of the information A and user features of the user A and the user B are input to a conversion prediction model. The conversion prediction model may output a probability that the user A and the user B perform a conversion operation such as a click on the information A.

Apparently, in this way, a probability that each candidate user performs the predetermined conversion operation on the to-be-delivered information may be easily predicted. In this way, in step S130, the target user determined by combining the similarity and the probability ensures in at least the two dimensions that the target user has a quite probability of performing the predetermined conversion operation on the to-be-delivered information.

Figure 2:
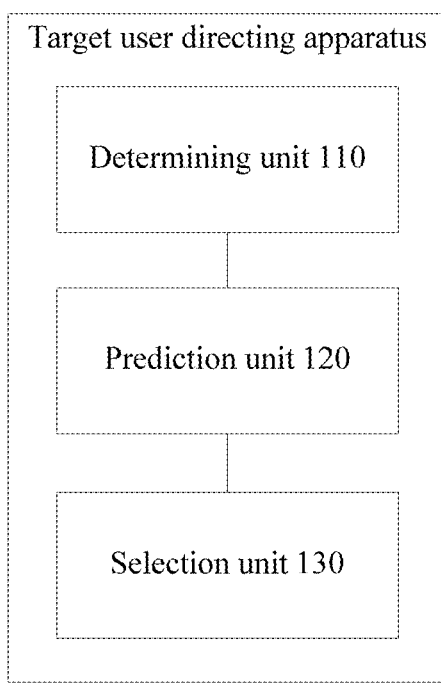
FIG. 2 is a schematic structural diagram of a target user directing apparatus according to an exemplary embodiment.

As shown in FIG. 2, this exemplary embodiment provides a target user directing apparatus, including:

a determining unit 110, configured to determine a similarity between candidate users and a seed user by using a similarity model;

a prediction unit 120, configured to predict, by using a conversion prediction model, a probability that the candidate users perform a predetermined conversion operation on to-be-delivered information; and a selection unit 130, configured to select a target user of the to-be-delivered information from the candidate users according to the similarity and the probability.

The target user directing apparatus provided in this exemplary embodiment may be an apparatus that is applied in various electronic devices, for example, that is applied in a server or a service platform for determining target users of various to-be-delivered information.

The determining unit 110, the prediction unit 120 and the selection unit 130 may all be corresponding to a server or a processing circuit. The processor may include a central processing unit, a microprocessor, a digital signal processor, or a programmable array. The processing circuit may include an application-specific integrated circuit and so on.

The processor or the processing circuit may be connected to a storage medium by using a communications interface inside a device such as an IIS. Functions of the foregoing determining unit 110, the prediction unit 120 and the selection unit 130 may be implemented by reading an executable code stored in the storage medium or by processing of a signal of the circuit.

The target user directing apparatus provided in this exemplary embodiment may select a target user for delivering to-be-delivered information from candidate user in two dimensions, namely, a similarity and a probability of performing a predetermined conversion operation. The target user determined in this way has features of the high directing accuracy and a high probability of performing a determined conversion operation after information is delivered.

In some exemplary embodiments, the selection unit 130 is configured to: calculate directing scores of the candidate users by using the similarity, the probability, and a preset function relationship; and select a candidate user whose directing score satisfies a preset directing condition, as the target user.

In this exemplary embodiment, the directing scores are determined based on calculating the preset function relationship. The probability and the similarity are respectively input as the dependent variables of the preset function relationship. The directing scores are obtained by calculating the function relationship. The candidate user whose directing score satisfies the preset condition is selected as the target user. In this exemplary embodiment, a specific structure of the selection unit 130 may include a calculator or a processor that has a calculation function. The selection unit 130 may further be corresponding to a comparator, a processor that has a comparison and ranking function, or the like. The candidate user whose directing score satisfies the preset directing condition is selected as the target user by comparison, ranking and so on. For example, if a higher directing score indicates a higher similarity between the user and the seed user and a higher probability of performing the predetermined conversion operation on to-be-delivered information, and a candidate user that ranks in front may be selected as the target user by ranking, or a candidate user whose directing score is greater than a preset threshold value is selected as the target user.

The target user directing apparatus according to this exemplary embodiment specifically defines, based on the previous embodiment, a structure of the selection unit 130 of the target user, and has features of the high accuracy of the selected target user and a high probability of a predetermined conversion operation after information is delivered.

In some exemplary embodiments, the selection unit 130 is configured to: calculate directing scores of the candidate users by using the similarity, the probability, and a preset function relationship; and select a candidate user whose directing score satisfies a preset directing condition, as the target user.

The selection unit 130 is configured to: determine a first weight of the similarity and a second weight corresponding to the probability; and calculate the directing score by using the similarity, the first weight, the probability, the second weight, and the preset function relationship.

In this exemplary embodiment, to flexibly adjust an effect degree of the similarity and the probability of performing the predetermined conversion operation on directing sores. The first weight and the second weight are introduced in this exemplary embodiment. The first weight is usually greater than the second weight, and an effect degree of the similarity on the directing scores is greater than that of the probability. If the second weight is greater than the first weight, the effect degree of the probability on the directing scores is greater than that of the similarity. The first weight and the second weight may be determined according to information attribute of the to-be-delivered information, and may alternatively be directly determined according to a user indication. In short, in this exemplary embodiment, the effect degree of the two dimensions, that is, the similarity and the probability, on the directing scores may be flexibly adjusted by introducing the first weight and the second weight, thereby easily selecting a most suitable target user of the to-be-delivered information.

In some exemplary embodiments, the apparatus further includes: a first training unit, configured to: before the similarity is determined, extract a user feature of the seed user as a first positive example user, as a positive example feature for training the similarity model; extract a user feature of a first negative example user, as a negative example feature for training the similarity model; and perform model training by using the positive example feature and the negative example feature, to obtain the similarity model.

In this exemplary embodiment, the first training unit may be corresponding to the processor or the processing circuit, and may train a neural network and a learning machine, to obtain the similarity model. In this exemplary embodiment, the user feature of the seed user may be extracted as the positive example feature, another user besides a first seed user may be regarded as a negative example user, and the negative example feature is extracted.

In this exemplary embodiment, the similarity model obtained by training by using the first training unit may accurately determine the similarity between the candidate users and the seed user.

In addition, the apparatus may further include:

a second training unit, configured to: before the probability is determined, extract, according to delivery data of delivered information, a user performing the conversion operation on the delivered information, as a second positive example user; extract, according to delivery data of delivered information, a user not performing the conversion operation on the delivered information, as a second negative example user; and perform model training by using an information feature of the delivered information, and user features of the second positive example user and the second negative example user, to obtain the conversion prediction model.

In this exemplary embodiment, the second training unit may similarly be corresponding to the processor or the processing circuit. For related descriptions of the processor or the processing circuit, reference may be made to the foregoing embodiments, and details are not repeated herein. However, this exemplary embodiment and the processor or the processing circuit corresponding to the second training unit are configured to train the conversion prediction model. The probability that candidate users perform the predetermined conversion operation on the to-be-delivered information may be accurately predicted by using the conversion prediction model obtained by the second training unit.

In some exemplary embodiments, the apparatus further includes:

an output unit, configured to output, by using the similarity model, a core feature for determining the similarity, wherein the core feature is a same feature or a similar feature between seed users.

The output unit according to this exemplary embodiment may be corresponding to various output structure, for example, the output unit may be corresponding to various types of displays. The displays may include a liquid crystal display, a projection display, an electronic ink display, an organic light-emitting diode (OLED) display, and so on. The output unit outputs the core feature by displaying, facilitating a provider or a publisher of to-be-delivered information to determine which user features are strong distinction degree features for distinguishing a target user and a non-target user in the candidate user.

The prediction unit 120 may further be configured to: extract an information feature of the to-be-delivered information; extract user features of the candidate users; and input the information feature of the to-be-delivered information and the user features of the candidate users to the conversion prediction model, to predict the probability.

In this exemplary embodiment, the prediction unit 120 extracts the information feature of the to-be-delivered information and the user features of the candidate users, as input parameters of a conversion prediction model. The input parameters is processed by using the conversion prediction model to output the probability that each candidate user performs the predetermined conversion operation on the to-be-delivered information, which has a feature of implementing easily.

One or more exemplary embodiments further provide a computer storage medium. Computer executable instructions are stored in the computer storage medium, and the computer executable instructions are used to perform at least one of the target user directing methods provided in any of the foregoing embodiments, for example, at least one of the methods as shown in FIG. 1, FIG. 3, FIG. 5 or FIG. 6.

The computer storage medium may be a random storage medium RAM, a read-only storage medium ROM, or a flash memory, a magnetic tape, an optical disc, or the like, and may optionally be a non-transitory storage medium.

The following provides several specific examples with reference to any of the foregoing embodiments.

Example 1

Figure 3:
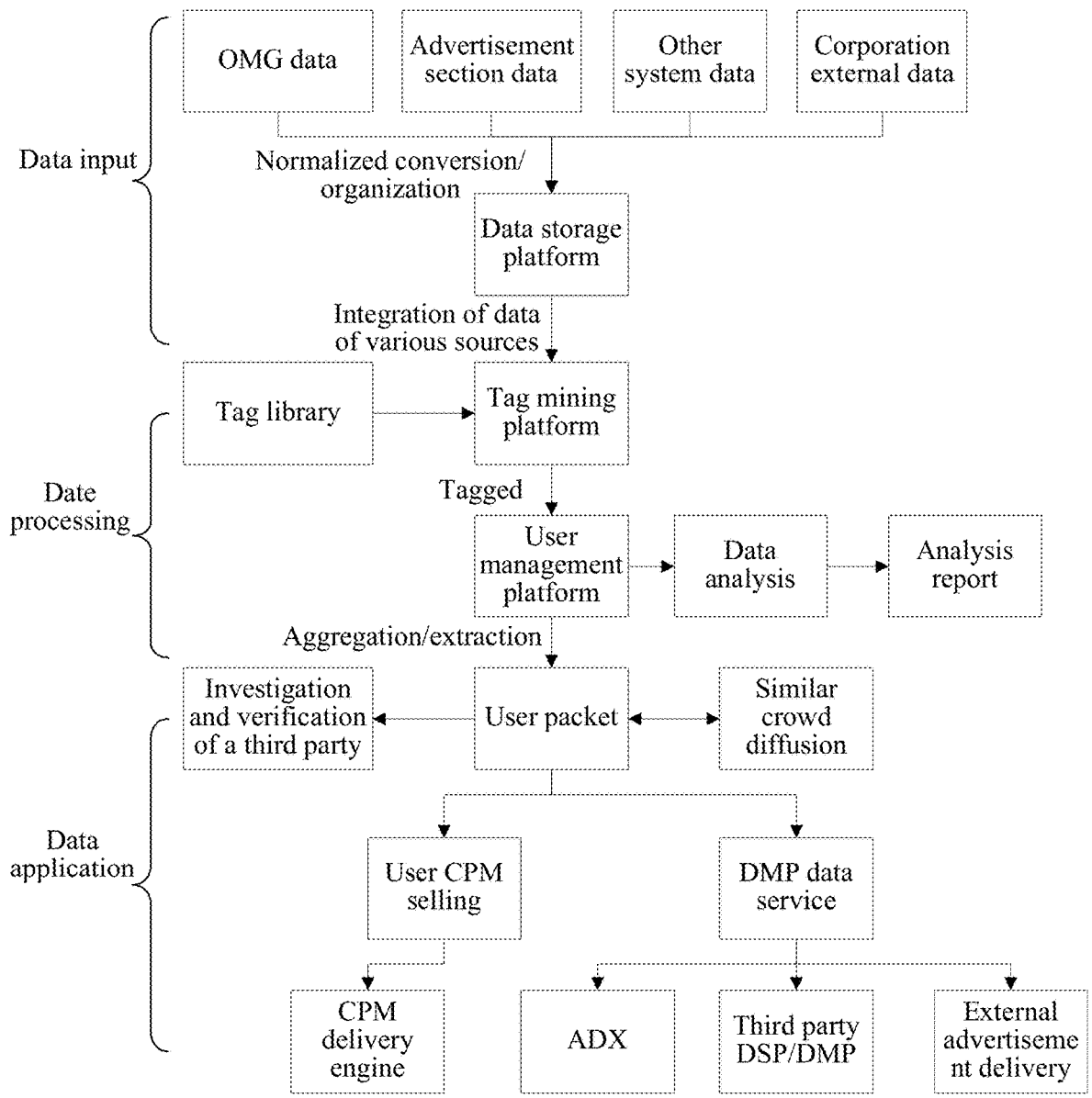
FIG. 3 is a schematic structural diagram of an advertisement distribution system architecture according to an exemplary embodiment.

As shown in FIG. 3, the present example provides an advertisement distribution system architecture, including three parts, namely, data input, data processing and data application. The system shown in FIG. 3 is described by using an advertisement distribution system of Tencent.

In a part of data output, a normalized conversion/organization is performed on data of Online Media Group (OMG), advertisement section data, other system data and corporation external data. The converted/organized data is stored to a data storage platform. For example, the OMG data and the advertisement section data are both data of a system A. The other system data is data of other systems besides the system A. If the system A is a Tencent system, the other system data is data generated by using other systems besides the Tencent system.

In a data processing stage, data of various sources is first integrated, and then tag data mining is performed by using a tag in a tag library. For example, users of different ages are attached with tags related to grades. The tagged data is output to a user management platform. A data management platform performs data analysis on the tagged data again, to obtain an analysis report.

In a data application stage, the user management platform aggregates/extracts the stored data, to obtain a user packet of user features of a plurality of users. To ensure the authenticity of the data, the data in the user packet may be input to a third party to perform an investigation and a verification. The user packet may further be configured to perform similar crowd diffusion. In the present example, the performing similar crowd diffusion may include selecting a similar user similar to the seed user. The similar user herein is the foregoing target user.

A data service of a data management platform (DMP) is provided by the user packet performs cost per thousand impressions (CPM) sales.

A CPM delivery engine delivers data to a user in a user packet obtained by using similar crowd diffusion.

javascript:void(0); An advertisement exchange platform (ADX) is provided to perform an advertisement exchange based on the user packet.

The ADX is configured to provide the user packet for a third party DSP/DMP, Chinese corresponding to the DSP is "需求方平台", and the DSP is an abbreviation of "Demand Server Platform".

The ADX is configured to provide the user packet for an external advertisement delivery.

A core of the DMP lies in a middle user management platform. For a brand advertisement, an advertiser performs a crowd extraction, a portrayal analysis, a calculation and a query of a user inventory, and similar diffusion of a user on the user management platform. The similar diffusion of the user herein may be directing of the foregoing target user.

In the present example, directing of the target user mainly includes three parts:

a first step: training of the similarity model;

a second step: training of the click prediction model; and a third step: selecting the target user by using the similarity model and the click prediction model, to implement diffusion of similar users based on the seed user.

After uploading the seed user on the DMP platform, a user determines to diffuse seed users and receive a diffusion scale input by the user and a to-be-delivered advertisement. The similarity model is obtained by training, and directing scoring is performed on each candidate user by using the similarity model and the click prediction model. Finally a crowd that conforms to a scale specified by a user is given according to the directing scores, and a core feature of the seed user is output to perform a visualized display.

In the present example, the to-be-delivered advertisement is the foregoing to-be-delivered information. The diffusion scale may include the number of target users that to be selected. The click prediction model is one of the foregoing conversion prediction models.

Example 2

Figure 4:
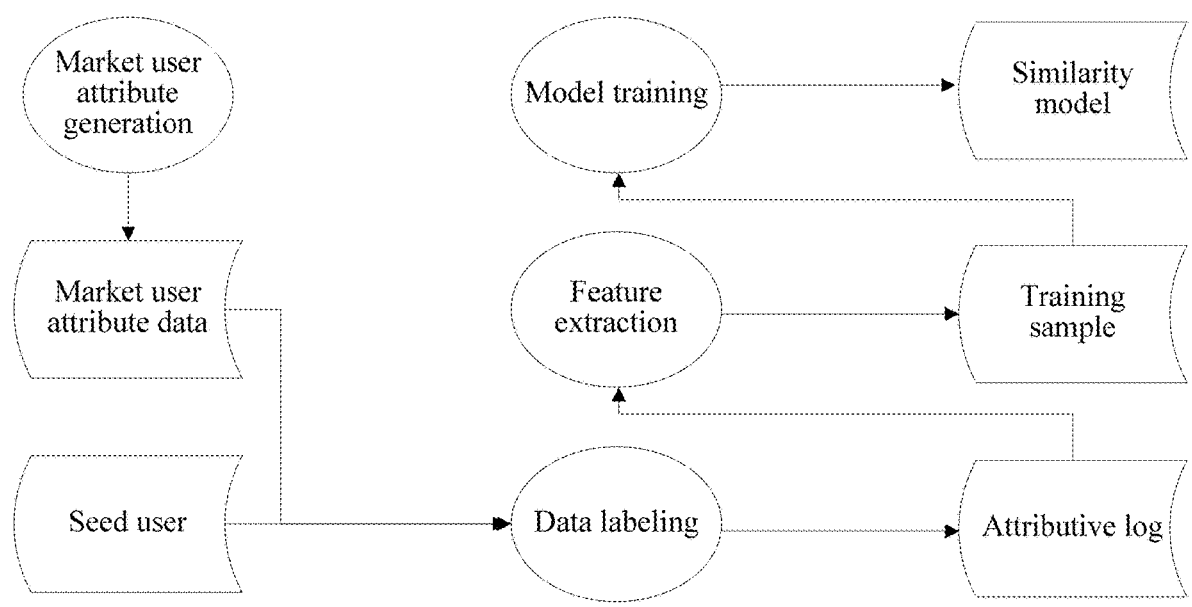
FIG. 4 is schematic diagram of a training process of a similar model according to an exemplary embodiment.

As shown in FIG. 4, the present example provides a method for training the similarity model based on the previous example. The method includes:

market user attribute generation: the market user herein is the foregoing second negative example user; and the market user attribute generation includes obtaining various user data of a user provided by the user including a plurality of data sources;

market user attribute data: after market user attribute generation, that is, after obtaining the user data, extracting market user attribute data, for example, various data that represents a population attribute, a device attribute and an interest attribute of a user;

date labeling: date labeling is respectively performed on attributive data of the seed user and the market user. The date labeling herein forms an attributive log. For example, some market users are labeled as negative example users, and the seed user is labeled as a positive example user. The seed user herein is the first positive example user in the foregoing embodiments, and the market user may be the first negative example user;

feature extraction: including respectively extracting user features of the positive example user and the negative example user, to form a training sample; and model training: performing model training by using the training sample to obtain the similarity model.

Specifically, for example, in FIG. 4, after the seed user and the market attribute data are combined, the seed user is labeled as the positive example user, and negative example user is obtained after potential users that are not in seed users are sampled. After the positive example user and the negative example user are labeled, the feature extraction and the model training are performed. Model feature input includes a population attribute (gender, age, location, occupation, and so on), a device attribute (type, brand, operator of a used device, and so on) and an interest attribute (a browsing behavior feature of the media, a game preference, and so on) of the positive example user. The model training is mainly performed in a logistic regression training algorithm frame built on spark training. The similarity model obtained by training is saved as a file to be configured to calculate the similarity later. The training algorithm may automatically filter a relatively weak feature, well avoiding the prediction accuracy brought by an unimportant feature.

Example 3

Figure 5:
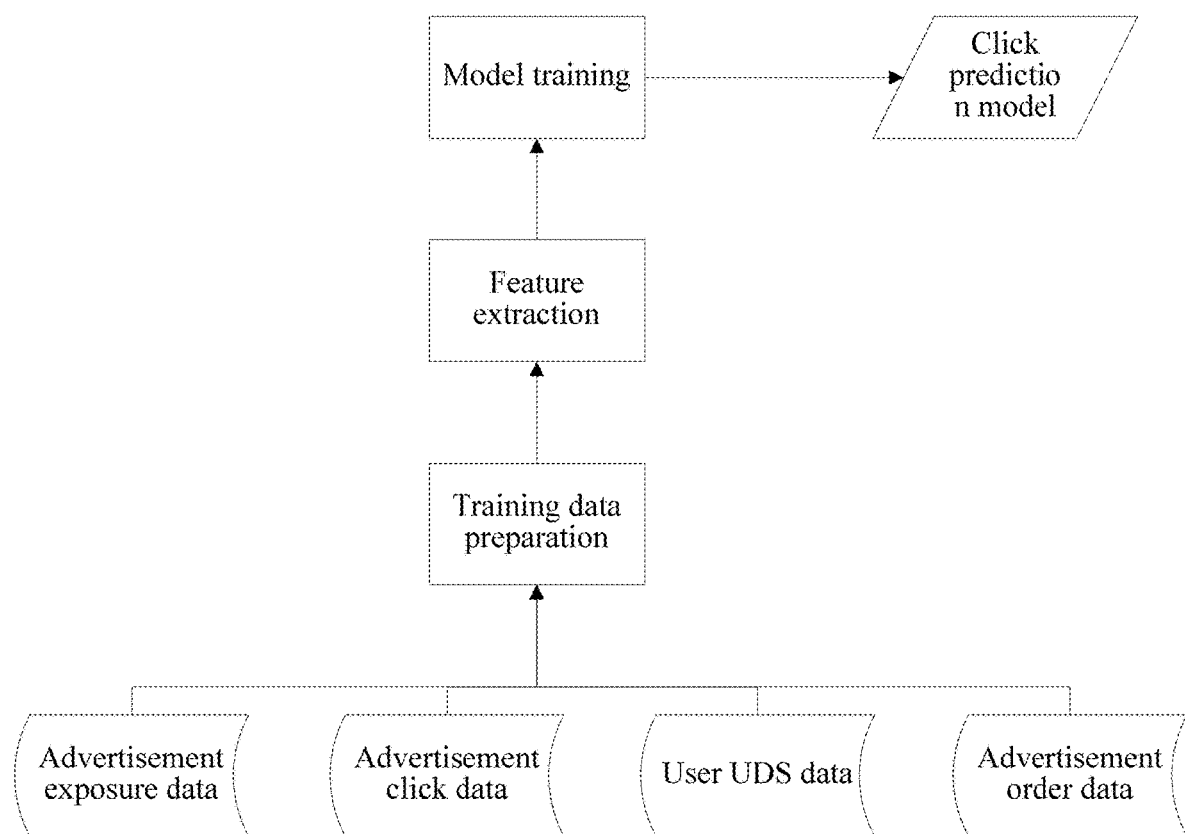
FIG. 5 is schematic diagram of a training process of a click prediction model according to an exemplary embodiment.

As shown in FIG. 5, the present example provides a method for training the click prediction model based on the previous example. The method includes:

a training data preparation stage: achieving advertisement exposure data, advertisement click data, demand-side platform (DSP) data and advertisement order data. The advertisement order data herein may include the information feature of the foregoing delivered data. The advertisement exposure data may include display data of the delivered advertisement. The advertisement click data may include various data such as clicked times, a frequency and a clicker;

feature extraction: extracting the user feature and the information feature; and model training: performing model training by using the extracted user feature and information feature to obtain the click prediction model.

Example 4

Figure 6:
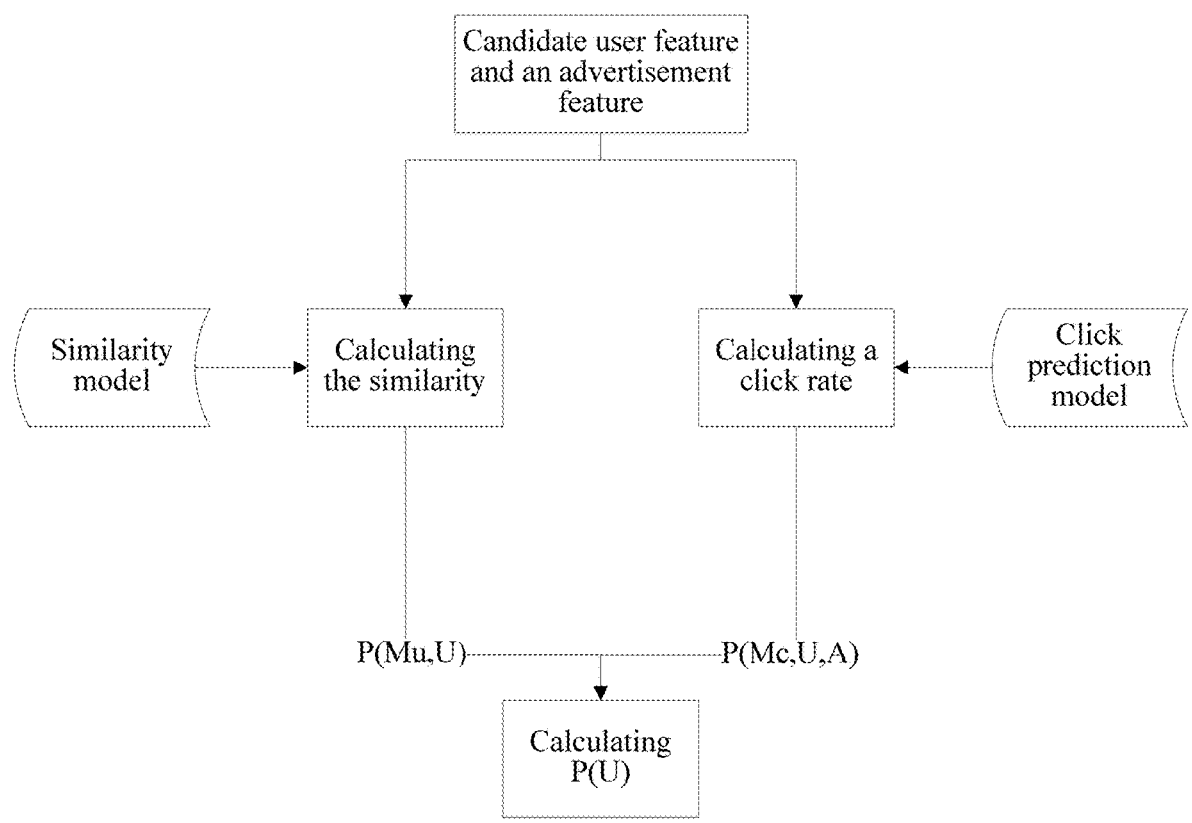
FIG. 6 is a schematic diagram of a calculation process of a directing score according to an exemplary embodiment.

As shown in FIG. 6, the present example provides a method for calculating directing scores based on the previous example. The method includes:

a candidate user feature and an advertisement feature: inputting the features to the training model and the click prediction model. Specifically, for example, the candidate user feature is input to the similarity model, and the candidate user feature and the advertisement feature are input to the click prediction model;

calculating a similarity: calculating a similarity P (Mu, U) between candidate users and a seed user by using the similarity model;

calculating a click rate: estimating a click rate P (Mu, U, A) that each candidate user clicks on an advertisement corresponding to the advertisement feature by using the click prediction model. The click rate herein is one of the foregoing probabilities of performing the predetermined conversion operation; and calculating directing scores: determining P(U) based on P (Mu, U) and P (Mu, U, A).

Example 5

The present example provides a method for outputting a result of target user directing based on the system architecture provided in Example 1. The method includes that:

a target user output includes two parts: model transparency information and user directing scores.

The model transparency information includes a core feature that discloses a seed crowd and that has a relatively high distinction degree. A method for determining the core feature is mainly calculating the IGR of each user attribute of training data of a similarity diffusion model. It is assumed that a user feature is C, a user feature vector is x, and H is information entropy.

$$IGR = \frac{H(C) - \frac{xi}{\sum xi} H(C \mid Xi)}{\sum H(Xi)}$$

A user directing score input is the similarity Mu of outputting the similarity model and the probability Mc of outputting the click prediction model. A prediction output includes the marker user U and the to-be-delivered advertisement A. A calculation formula of each market user Ui is as follows: $P(U_i) = \alpha * P(_U, U_i) + \beta * P(M_C, U_i, A)$ $\alpha$ and $\beta$ respectively represent the similarity and a weight of the click rate, and may be correspondingly adjusted according to a service scenario; and the i is an ith feature value of the user feature x. $P(_U, U_i)$ and $P(M_C, U_i, A)$ are real numbers between 0 to 1, and respectively represent a user similarity and a probability of clicking on an advertisement. For example, the user feature x is an age feature. The ith feature value may be corresponding to a feature value that an age is 20 to 30.

Example 6

Figure 7:
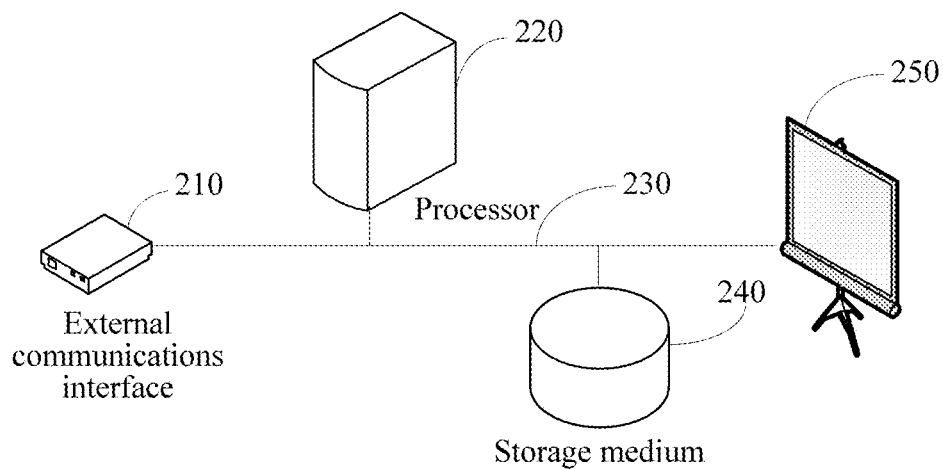
FIG. 7 shows a target user directing apparatus according to an exemplary embodiment.

As shown in FIG. 7, the present example provides a target user directing apparatus, including a processor 220, a storage medium 240 and at least one external communications interfaces 21. The processor 220, the storage medium 240 and the at least one external communications interfaces 210 are all connected by using a bus 230. The processor 220 may be an electronic component having a processing function, for example, a microprocessor, a central processing unit, a digital signal processor, an application processor or a programmable logic array. The store medium 240 stores computer executable instructions. The processor 220 executes the computer executable instructions stored in the store medium 240, and may implement the target user directing method provided by any technical solution of the foregoing embodiments, for example, the method as shown in FIG. 1.

In the several embodiments provided in this application, it should be understood that the disclosed device and method may be implemented in other manners. The described device embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in a same place, or may be distributed to many network units. Some or all of the units may be selected according to actual requirements to implement the purpose of the solution of the exemplary embodiments.

In addition, functional units in one or more exemplary embodiments may be all integrated in a processing module, each unit is separately used as a unit, or two or more units are integrated in a unit. The integrated unit may be implemented in a form of hardware, or may be implemented in form of hardware plus a software functional unit.

A person of ordinary skill in the art may understand that, some or all of steps for implementing the method embodiments may be implemented by using hardware related to a program instruction. The program may be stored in a computer readable storage medium. When the program is executed, the steps including the method embodiments are performed. However, the storage medium includes various types of media that may store program code, for example, a mobile storage device, a read-only memory (ROM), a random access memory (RAM), a magnetic disk, or an optical disk.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method comprising:
extracting, by at least one processor as a positive example feature for training a similarity model, a user feature of a seed user as a first positive example user;
extracting, by the at least one processor as a negative example feature for training the similarity model, a user feature of a first negative example user; and
training, by the at least one processor, the similarity model using the first positive example feature and the first negative example feature;
determining, by the at least one processor, a similarity between each of a plurality of candidate users and a seed user using the trained similarity model;
pushing, by the at least one processor, a digital advertisement to a social application interface of candidate users whose similarity with the seed user is greater than a threshold similarity;
extracting, by the at least one processor as a second positive example user, according to data of the pushed digital advertisement, a user performing a click operation, an attention operation, or a purchase operation on the pushed digital advertisement through the social application interface;
extracting, by the at least one processor as a second negative example user, according to data of the pushed digital advertisement, a user not performing the click operation, the attention operation and the purchase operation on the pushed digital advertisement through the social application interface; and
training, by the at least one processor, a conversion prediction model using an information feature of the pushed digital advertisement, a first user feature of the second positive example user and a second user feature of the second negative example user;
predicting, by the at least one processor using the trained conversion prediction model, a probability that each of the plurality of candidate users will perform a click operation, an attention operation, or a purchase operation on a to-be-delivered digital advertisement;
determining a first weight of the similarity and a second weight corresponding to the probability for each of the plurality of candidate users; and
calculating a plurality of directing scores based on the similarity, the first weight, the probability, the second weight, and the function relationship between the similarity and the probability; and
selecting, as one or more target users by the at least one processor, candidate users whose directing score satisfies a directing condition, from among the plurality of candidate users; and
pushing the to-be-delivered digital advertisement to a social application interface of the one or more target users.

2. The method according to claim 1, wherein
the method further comprises:
outputting, using the similarity model, a core feature for determining the similarity, wherein the core feature is a same feature or a similar feature among a plurality of seed users,
wherein the one or more target users are further selected based on the core feature.

3. The method according to claim 1, wherein the predicting comprises:
extracting an information feature of the to-be-delivered digital advertisement;
extracting a plurality of user features of the plurality of candidate users; and
inputting the information feature and the plurality of user features to the conversion prediction model, to predict the probability.

4. An apparatus comprising:
at least one memory configured to store computer program code; and
at least one processor configured to access the at least one memory and operate according to the computer program code, the computer program code including:
first training code configured to cause at least one of the at least one processor to:
extract, as a positive example feature for training a similarity model, a user feature of a seed user as a first positive example user;
extract, as a negative example feature for training the similarity model, a user feature of a first negative example user; and
train the similarity model using the positive example feature and the negative example feature;
determining code configured to cause at least one of the at least one processor to determine a similarity between each of a plurality of candidate users and a seed user by using the trained similarity model;
pushing code configured to cause at least one of the at least one processor to push a digital advertisement to a social application interface of candidate users whose similarity with the seed user is greater than a threshold similarity;
second training code configured to cause at least one of the at least one processor to:
extract, as a second positive example user, according to data of the pushed digital advertisement, a user performing a click operation, an attention operation or a purchase operation on the pushed digital advertisement through the social application interface;
extract, as a second negative example user, according to data of the pushed digital advertisement, a user not performing the click operation, the attention operation or the purchase operation on the pushed digital advertisement through the social application interface; and
train a conversion prediction model using an information feature of the pushed digital advertisement, a first user feature of the second positive example user and a second user feature of the second negative example user;
prediction code configured to cause at least one of the at least one processor to predict, by using the trained conversion prediction model, a probability that each of the plurality of candidate users performs a click operation, an attention operation or a purchase operation on a to-be-delivered digital advertisement;
selection code configured to cause at least one of the at least one processor to:
determine a first weight of the similarity and a second weight corresponding to the probability for each of the plurality of candidate users;
calculate a plurality of directing scores by using the similarity, the first weight, the probability, the second weight, and a function relationship between the similarity and the probability; and
select, as the one or more target users, candidate users whose directing score satisfies a directing condition, from among the plurality of candidate users; and
transmitting code configured to cause at least one of the at least one processor to push the to-be-delivered digital advertisement to a social application interface of the one or more target users.

5. The apparatus according to claim 4, wherein the computer program code further comprises output code configured to cause at least one of the at least one processor to output, by using the similarity model, a core feature for determining the similarity, wherein the core feature is a same feature or a similar feature among a plurality of seed users,
wherein the one or more target users are further selected based on the core feature.

6. The apparatus according to claim 4, wherein the prediction code is further configured to cause at least one of the at least one processor to:
extract an information feature of the to-be digital advertisement;
extract a plurality of user features of the plurality of candidate users; and
input the information feature and the plurality of user features to the conversion prediction model, to predict the probability.

7. A non-transitory computer readable storage medium storing a computer program which, when executed by a computer, performs the following operations:
determining a similarity between each of a plurality of candidate users and a seed user using a similarity model;
predicting, using a conversion prediction model, a probability that each of the plurality of candidate users will perform a click operation, an attention operation, or a purchase operation on a to-be-delivered digital advertisement;
selecting one or more target users for the to-be-delivered digital advertisement from the plurality of candidate users, according to the similarity that is determined and the probability that is predicted for each of the plurality of candidate users; and
pushing the to-be-delivered digital advertisement to a social application interface of the one or more target users,
wherein the selecting comprises:
calculating a plurality of directing scores of the plurality of candidate users using the similarity, the probability, and a function relationship between the similarity and the probability; and
selecting, as the one or more target users, candidate users whose directing score satisfies a directing condition, from among the plurality of candidate users,
wherein the calculating comprises:
determining a first weight of the similarity and a second weight corresponding to the probability for each of the plurality of candidate users; and
calculating the directing scores based on the similarity, the first weight, the probability, the second weight, and the function relationship,
wherein before determining the similarity, the method comprises:
extracting, as a positive example feature for training the similarity model, a user feature of the seed user as a first positive example user;
extracting, as a negative example feature for training the similarity model, a user feature of a first negative example user; and
training a similarity model using the positive example feature and the negative example feature, and
wherein, before predicting the probability, the method comprises:
pushing a digital advertisement to a social application interface of candidate users whose similarity with the seed user is greater than a threshold similarity;

extracting, as a second positive example user, according to data of the pushed digital advertisement, a user performing the click operation, the attention operation or the purchase operation on the pushed digital advertisement through the social application interface;

extracting, as a second negative example user, according to data of pushed digital advertisement, a user not performing the click operation, the attention operation or the purchase operation on the pushed digital advertisement through the social application interface; and training a conversion prediction model using an information feature of the pushed digital advertisement, a first user feature of the second positive example user and a second user feature of the second negative example user.

8. The non-transitory computer readable storage medium according to claim 7, wherein the computer program, when executed by the computer, further performs:

outputting, using the similarity model, a core feature for determining the similarity, wherein the core feature is a same feature or a similar feature among a plurality of seed users, wherein the one or more target users are further selected based on the core feature.

\* \* \* \* \*